United States Patent [19]

Spurk

[11] Patent Number: 4,485,779
[45] Date of Patent: Dec. 4, 1984

[54] INTERNAL COMBUSTION PISTON ENGINE INCLUDING A CYLINDER HAVING A MAIN COMBUSTION CHAMBER AND AT LEAST ONE SECONDARY COMBUSTION CHAMBER

[76] Inventor: Joseph H. Spurk, Ausserhalb 3, 6123 Bad König, Oberkinzig, Fed. Rep. of Germany

[21] Appl. No.: 604,124

[22] Filed: Apr. 25, 1984

Related U.S. Application Data

[63] Continuation of Ser. No. 451,223, Dec. 20, 1982, abandoned, which is a continuation of Ser. No. 177,550, Aug. 13, 1980, abandoned.

[51] Int. Cl.³ .............................................. F02B 19/04
[52] U.S. Cl. ............................... 123/289; 123/279; 123/193 P; 123/661
[58] Field of Search .............. 123/289, 286, 292, 279, 123/269, 281, 285, 193 C, 193 CH, 193 P, 193 CP, 193 R, 659, 661

[56] References Cited

U.S. PATENT DOCUMENTS 2,222,440 11/1940 Nawman .

FOREIGN PATENT DOCUMENTS

| 0095052 | 2/1923 | Austria . |
|---|---|---|
| 0182767 | 12/1904 | Fed. Rep. of Germany . |
| 0201155 | 9/1919 | Fed. Rep. of Germany . |
| 0347932 | 1/1923 | Fed. Rep. of Germany . |
| 0494087 | 3/1930 | Fed. Rep. of Germany . |
| 2745902 | 4/1978 | Fed. Rep. of Germany . |
| 2650663 | 5/1978 | Fed. Rep. of Germany . |
| 2800481 | 3/1979 | Fed. Rep. of Germany . |
| 2746774 | 4/1979 | Fed. Rep. of Germany . |
| 556650 | 7/1923 | France . |
| 847467 | 10/1939 | France . |
| 1540274 | 9/1968 | France . |
| 2406721 | 5/1979 | France . |

OTHER PUBLICATIONS

Decision of German Patent Board: "Bundes patent gericht", Beschluss, betreffend die Patentanmeldung, P2908756.7-13, Nov. 30, 1983, Munich, Germany.

*Primary Examiner*—Parshotam S. Lall
*Attorney, Agent, or Firm*—John C. Smith, Jr.

[57] ABSTRACT

An internal combustion piston engine comprises a cylinder with a cylinder bore therein; a cylinder head mounted on said cylinder; a piston reciprocably movable in said cylinder bore, and a main combustion chamber formed between the cylinder head and the piston. At least one secondary combustion chamber is arranged to be connected at least temporarily to the main combustion chamber via at least one connecting channel whereby different compressions and hence different pressure rises occur during the compression stroke or the expansion stroke of the piston in the main combustion chamber or in the secondary combustion chamber. Control means are arranged in the zone of the connecting channel to enable the flow of the gases, which are under a higher pressure, from the main combustion chamber into the secondary combustion chamber or vice versa, to generate velocity fields which improve the turbulence, in particular in the quench zones of the main combustion chamber, and hence improve the combustion.

5 Claims, 9 Drawing Figures

INTERNAL COMBUSTION PISTON ENGINE INCLUDING A CYLINDER HAVING A MAIN COMBUSTION CHAMBER AND AT LEAST ONE SECONDARY COMBUSTION CHAMBER

This application is a continuation of application Ser. No. 451,223, filed Dec. 20, 1982, now abandoned, which is a continuation of application Ser. No. 177,550 filed Aug. 13, 1980, now abandoned.

BACKGROUND OF THE INVENTION

This invention relates to an internal combustion piston engine, the cylinder of which has a main combustion chamber, in which the combustion is initiated, and at least one secondary combustion chamber which is connected at least temporarily to the main combustion chamber via one or more channels.

Internal combustion piston engines with subdivided combustion chambers are known. Moreover, it is not novel that the combustion process can be influenced by this sub-division. Recently, an internal combustion engine of this type has been described, for example, in German Offenlegungsschrift 27 45 902. In the embodiment according to FIG. 4 of this printed publication, the main combustion chamber and the secondary combustion chamber are continuously connected to one another. Thus, approximately the same pressure prevails in the two chambers at the end of a compression stroke. The combustion process in the main combustion chamber can therefore be influenced only by moving pressure waves which are said to pass from the secondary combustion chamber into the main combustion chamber after the mixture has been ignited. In addition, heating of the thin, disc-shaped cap of the piston also plays a role in promoting combustion. It must be doubted whether it is possible substantially to improve the combustion and to reduce the emission of pollutants by means of the pressure waves which run at high velocity and only for a short time.

SUMMARY OF THE INVENTION

It is the object of the present invention to improve an internal combustion piston engine of the type indicated at the outset in such a way that, by means of controlled and longer-lasting flow processes, velocity fields which substantially improve the combustion are generated between the combustion chambers.

To attain this object the present invention provides an internal combustion piston engine comprising a cylinder having an inner wall defining a cylinder bore; a cylinder head having a wall and being mounted on said cylinder; a piston having a head and an axis and being reciprocably movable in said cylinder bore; a main combustion chamber formed between the cylinder head and the piston and in which the combustion is initiated by a spark plug; at least one secondary combustion chamber arranged to be connected at least temporarily to the main combustion chamber via at least one connecting channel whereby different compressions and hence different pressure rises occur during the compression stroke or the expansion stroke of the piston in the main combustion chamber or in the secondary combustion chamber, and control means arranged in the zone of the connecting channel to enable the flow of the gases, which are under a higher pressure, from the main combustion chamber into the secondary combustion chamber or vice versa, to generate velocity fields which improve the turbulence, in particular in the quench zones of the main combustion chamber, and hence improve the combustion.

The inventive concept on which these features are based consists in providing two combustion chambers which, during the compression stroke and also during the expansion stroke, are separated from one another for a short time and are arranged in such a way that different pressures are built up therein. When the control means are actuated by the motion of the piston and the combustion chambers are again connected to one another, pressure balancing occurs due to a flow from one combustion chamber into the other combustion chamber. In this way, velocity fields are necessarily generated, which favor the advance of the flame front and, due to improved turbulence, promote the reactions behind the flame front. The velocity fields also prevent the formation of undesired quench zones on the walls.

Advantageous embodiments and further developments of the invention are indicated in the sub-claims. The embodiments differ in the main in that the main combustion chambers are located in the cylinder or in the cylinder head, the secondary combustion chambers are located either in the piston, in the cylinder or in the cylinder wall and the connecting channels are located between the piston and the cylinder wall or in the cylinder head.

BRIEF DESCRIPTION OF THE DRAWINGS

Embodiments of the invention will now be described by way of example and with reference to the accompanying schematic drawings in which.

DESCRIPTION OF THE PREFERRED EMBODIMENTS

Figure 1A:
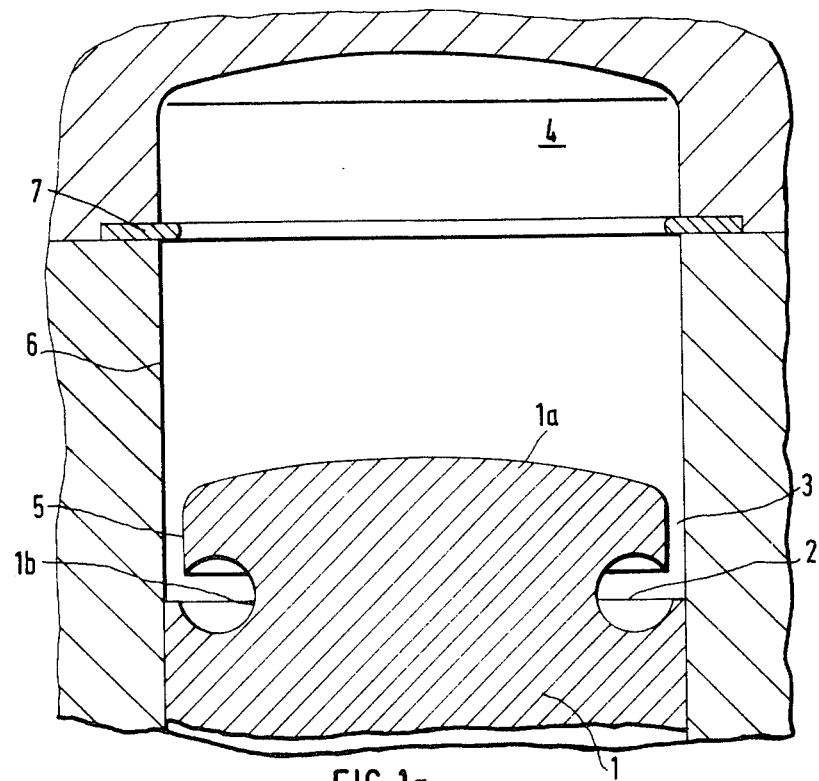
FIGS. 1a and 1b show a first embodiment with a seondary combustion chamber arranged in the piston.
Figure 1B:
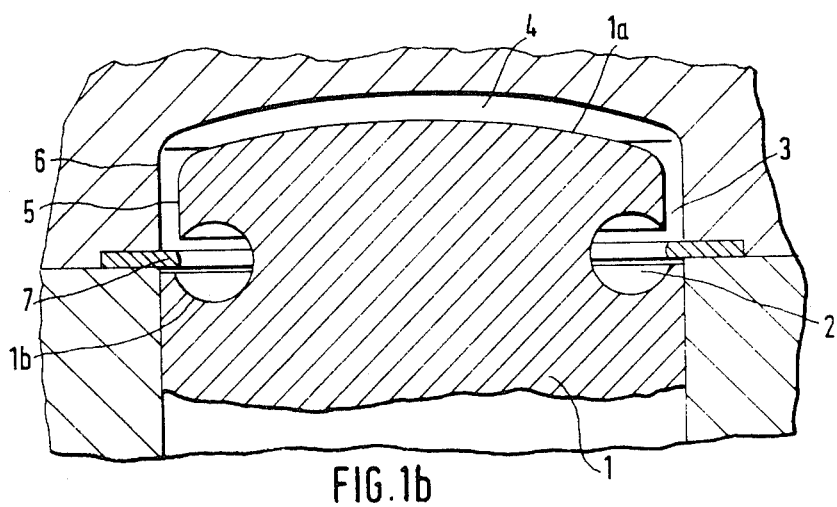

FIGS. 1a and 1b show a piston/cylinder arrangement comprising a piston 1 which is at its bottom dead center according to FIG. 1a and at its top dead center according to FIG. 1b. At a distance from the piston head 1a, the piston 1 has an approximately torus-shaped inward-directed cavity 1b which forms a secondary combustion chamber 2. At its end facing the main combustion chamber 4, the piston 1 is set back in the form of a step in such a way that a connecting channel 3 from the main combustion chamber 4 to the secondary combustion chamber 2 is formed by the annular gap between the cylindrical wall part 5 of reduced diameter of the step on the piston and the inner wall 6 of the cylinder. To control the flow through the connecting channel 3 as a function of the stroke of the piston 1, an annular projection is provided on the inner wall 6 of the cylinder, which annular projection can, for example, be formed by a sealing strip 7 inserted into the inner wall of the cylinder. The annular projection or the sealing strip 7 is arranged in such a way that, in interaction with the cylindrical wall part 5 of reduced diameter of the step on the piston, it blocks the connecting channel 3 when the piston 1 is at some distance from its top dead center, and reopens the connection between the secondary combustion chamber 2 and the main combustion chamber 4 when the piston 1 has approached the top dead center.

Figure 2:
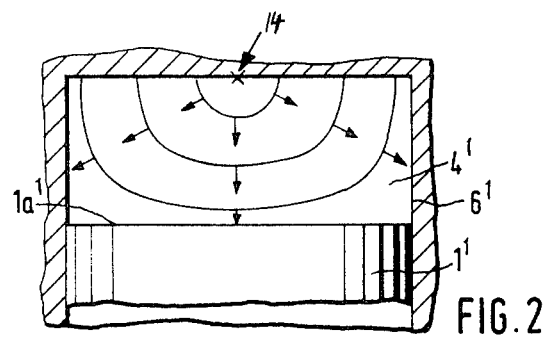
FIG. 2 shows a diagrammatic sketch of the advance of the flame front in the cylinder of a conventional internal combustion piston engine.
Figure 3:
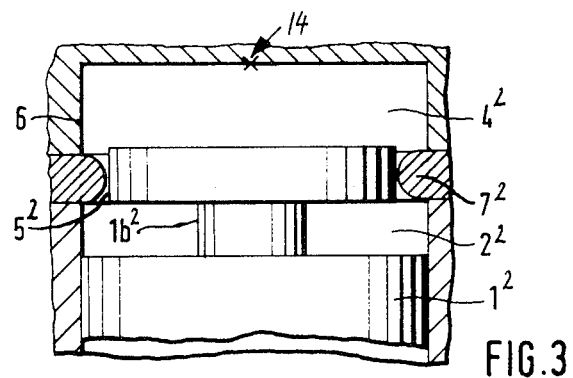
FIGS. 3 and 4 show schematic sketches of the control of the cross-flow and of the advance of the flame front in the arrangement according to FIGS. 1a and 1b.
Figure 4:
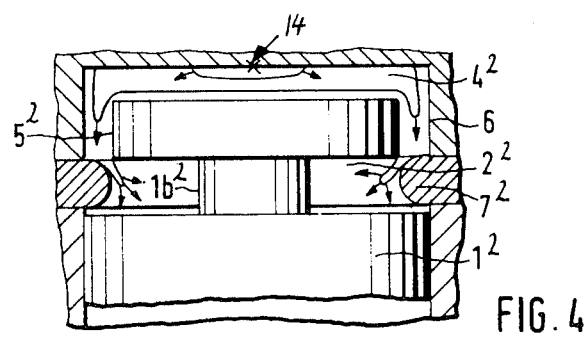

The mode of action of this control of the connecting channel 3 can be seen from FIGS. 2 to 4, in comparison with the conditions in a conventional internal combustion engine.

FIG. 2 shows the advance of the flame front in the cylinder of a conventional internal combustion engine having an undivided combustion chamber $4^1$. The lines in the combustion chamber $4^1$ show the course of the flame front at various points in time. The directions of advance of the flame front are indicated by arrows. It can be seen that, from the spark plug 14, the flame front moves initially almost spherically and then approximately perpendicular towards the head $1a^1$ of the piston $1^1$ and towards the inner wall $6^1$ of the cylinder. The flame front is extinguished in the vicinity of these walls so that quench zones are formed which contain an unburned or only partially burned mixture. Disregarding the low residual velocity in the gas, generated by the intake process, the flame front advances in virtually stagnant gas at a velocity which is caused by diffusion and heat conduction.

By contrast, FIGS. 3 and 4 show what happens in the cylinder of an internal combustion engine designed according to the invention.

In FIG. 3, the piston $1^2$ is at some distance from its top dead center. The gas in the main combustion chamber $4^2$ is separated from the secondary combustion chamber $2^2$ by the sealing strip $7^2$, preferably without contact, opposite the cylindrical wall part $5^2$ of reduced diameter of the step on the piston $1^2$. When the piston $1^2$ in FIG. 3 moves upwards, the gas in the main combustion chamber $4^2$ is compressed to a much greater extent than the gas in the secondary combustion chamber $2^2$. The degree of compression or of the difference in compression is essentially determined by the geometrical shape and the dimensions of the main combustion chamber $4^2$, the sealing strip $7^2$ and the secondary combustion chamber $2^2$ formed by the cavity $1b^2$. When the cylindrical wall part $5^2$ of reduced diameter of the step on the piston $1^2$ clears the sealing strip $7^2$ toward the end of the compression stroke of the piston $1^2$, gas flows at high velocity from the main combustion chamber $4^2$ into the secondary combustion chamber $2^2$. The flame front then forms approximately in accordance with the lines and arrows sketched in FIG. 4.

In contrast to the conditions in conventional internal combustion piston engines, the flame front in an embodiment according to the invention advances at a high velocity which results from the superposition of the flame front velocity in stagnant gas and the inherent velocity of the gas. In this way, the gas and flame front are moved along the walls of the cylinder chamber and of the piston at a high velocity so that very low thicknesses of the boundary layer and small quenching zone result. Moreover, the gas flowing at high velocity into the secondary combustion chamber creates strong turbulence in this combustion chamber so that complete combustion takes place in the latter.

During the downward stroke (expansion stroke) of the piston $1^2$, the main combustion chamber $4^2$ is separated again from the secondary combustion chamber $2^2$ by the sealing strip $7^2$ interacting with the cylindrical wall part $5^2$ of reduced diameter. For the reasons explained above in the context of compression, the expansion of the gas in the main combustion chamber $4^2$ is now much greater than in the secondary combustion chamber $2^2$ in which the combustion continues at approximately constant volume. The gas pressure in the secondary combustion chamber $2^2$ can therefore still rise, whilst it falls in the main combustion chamber $4^2$ due to the expansion. When the upper edge of the cylindrical wall part $5^2$ of reduced diameter, during its downward motion, clears the sealing strip $7^2$, gas flows at high velocity from the secondary combustion chamber $2^2$ into the main combustion chamber $4^2$ and creates strong turbulence of the incompletely burned gas quantities which may still be present there. Thus, complete combustion in the main combustion chamber $4^2$ is also promoted.

The arrangement of the main combustion chamber and of the secondary combustion chamber and also of the control means for the overflowing gases can also be realized constructionally in a different manner.

Figure 5:
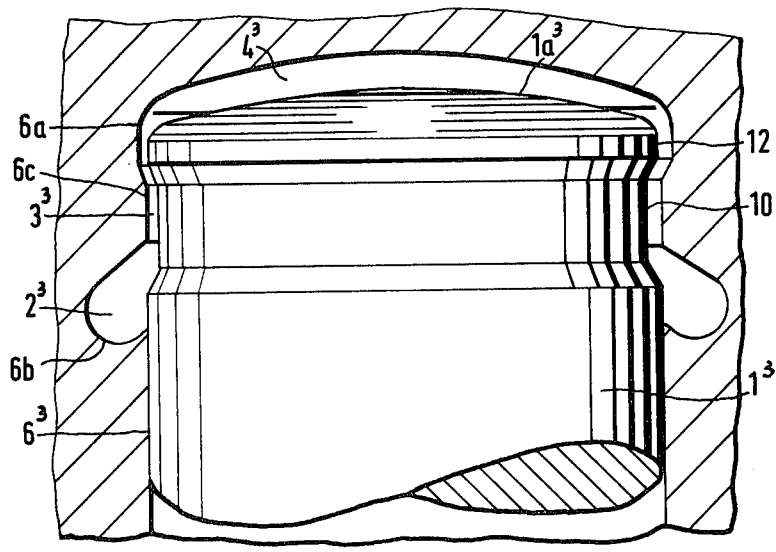
FIG. 5 shows an embodiment with a secondary combustion chamber arranged in the inner wall of the cylinder.

Thus, FIG. 5 shows an embodiment in which the secondary combustion chamber $2^3$ is formed by an approximately torus-shaped outward-directed cavity $6b$ in the inner wall $6^3$ of the cylinder. On the shell of the piston $1^3$, a shallow constriction 10 is provided which, together with the inner wall $6^3$ of the cylinder, delimits the connecting channel $3^3$ leading to the main combustion chamber $4^3$. In its upper part, the main combustion chamber $4^3$ is widened radially outwards. At the end of the shallow constriction 10, towards the piston head $1a^3$, the piston $1^3$ has approximately its normal external diameter corresponding to the cylinder bore so that, relative to the bottom of the shallow constriction 10, there is a collar-like annular projection 12 which interacts with that part $6c$ of the inner wall $6^3$ of the cylinder which extends between a widening $6a$ of the combustion chamber $4^3$ and the torus-shaped outward-directed cavity $6b$, in order to control the flow through the connecting channel $3^3$, in a manner similar to that already described in connection with FIGS. 3 and 4.

Figure 6:
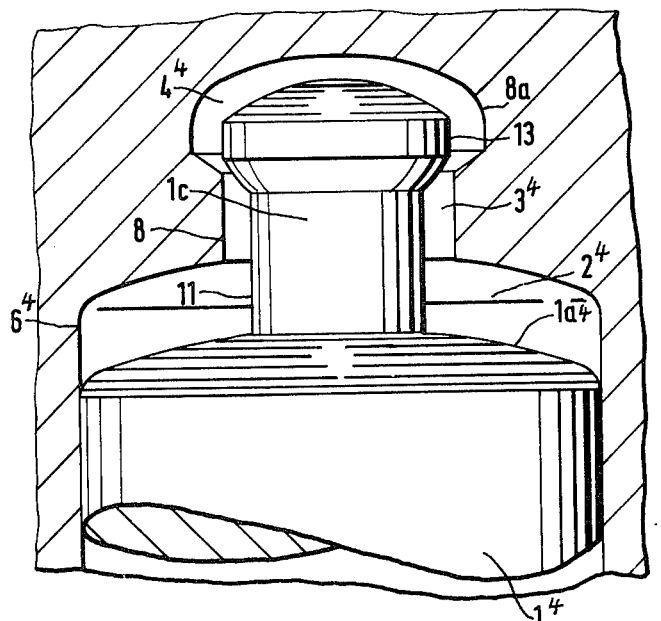
FIG. 6 shows a further embodiment in which the main combustion chamber is arranged in the end wall of the cylinder head.
Figure 8:
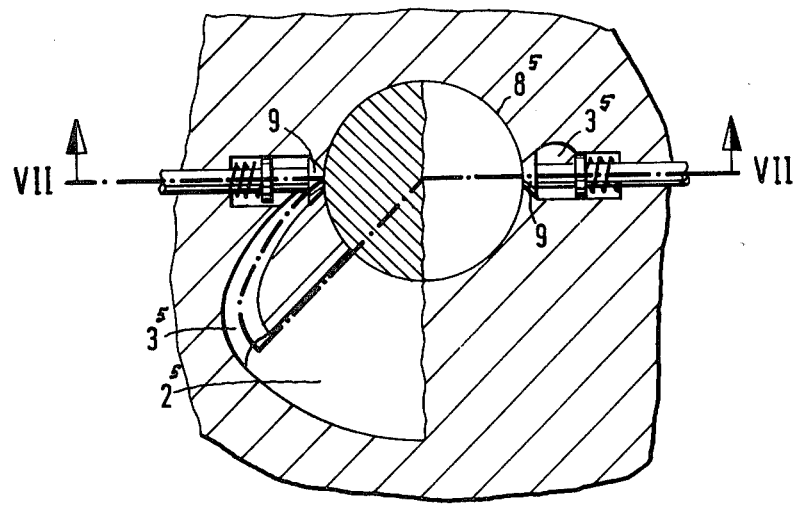

FIGS. 6 and 8 show two embodiments of the invention, in which the main combustion chamber is arranged in the end wall of the cylinder head.

According to FIG. 6, the piston $1^4$ shown in the vicinity of its top dead center has, on its head $1a^4$, a cylindrical projection $1c$ of a diameter which is smaller than that of the piston head. The cylinder bore is provided with an extension 8 which matches the piston projection $1c$ and which, together with the end face of the piston projection, forms the main combustion chamber $4^4$, whilst the secondary combustion chamber $2^4$ is delimited by the shoulder parts of the piston $1^4$ and the inner wall $6^4$ of the cylinder. Corresponding to the piston design according to FIG. 5, the piston projection $1c$ is here provided with a constriction 11 which is delimited by an annular collar 13 on the side toward the main combustion chamber $4^4$. The control of the gases flowing through the connecting channel $3^4$ is effected by the interaction of the annular collar 13 with the cylindrical wall section located between the secondary combustion chamber 2⁴ and a widening 8a of the extension 8 of the cylinder bore.

In the arrangement according to FIG. 6, differential compression or expansion of the gas in the two combustion chambers 2⁴ and 4⁴ is achieved by the fact that the volume of the secondary or of the main combustion chamber, remaining above the piston head 1a4 or the cylindrical projection 1c at the end of the compression stroke, is of different size in relation to the associated piston area. The size of the residual volumes, remaining above the piston 1a4 or the cylindrical projection 1c at the end of the compression stroke, can, for example, be influenced by appropriate dimensioning of the distance of the front faces of these piston parts from the end faces of the associated cylinder chambers. The final compression space can also be enlarged in this sense by radial widening. However, the slight widening 8a of the main combustion chamber, shown in FIG. 6, serves only to provide a control edge for the annular collar 13.

Figure 7:
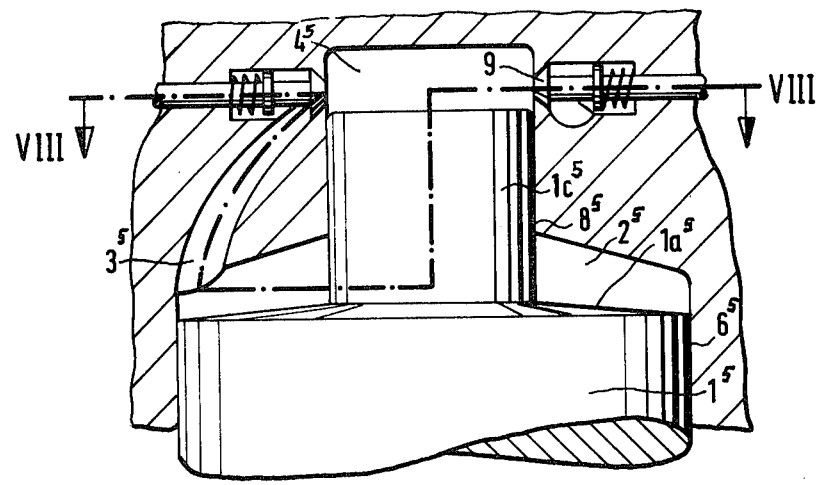
FIGS. 7 and 8 show, in longitudinal section and cross section along the lines VIII—VIII and VII—VII, respectively, an embodiment with a main combustion chamber arranged in the end wall of the cylinder head and with control valves in the connecting channels.

In the embodiment shown in FIGS. 7 and 8, the connection between the main combustion chamber 4⁵ and the secondary combustion chamber 2⁵ is made via connecting channels 3⁵ provided in the wall of the cylinder head. Also in this embodiment the secondary combustion chamber is delimited by the shoulder parts of the piston head 1a⁵ and the inner wall 6⁵ of the cylinder. To control the cross-flow processes, valves 9 are provided which are opened and closed either automatically by the pressure difference between the secondary combustion chamber 2⁵ and the main combustion chamber 4⁵ or by a mechanical drive. In addition to appropriate design and control of the valves 9, the gases can also be caused to flow from the secondary combustion chamber 2⁵ into the main combustion chamber 4⁵ by an arrangement in which the projection 1c⁵ of the piston 1⁵ completely leaves the cylinder extension 8⁵ and thus opens a flow cross section between the combustion chambers.

The connecting channels 3⁵ extend in the manner of a spatial helix in such a way that the gas flowing into the secondary combustion chamber 2⁵ induces in this chamber a turbulent flow which promotes combustion.

Incidentally, a vortex in the gases flowing across can be obtained also in the embodiments according to FIGS. 5 and 6, if the constrictions 10 and 11 of the piston and of the piston projection 1c, respectively, are sub-divided by radial ribs which follow a helix about the piston axis. The connecting channels remaining between the ribs impart to the gases, flowing across in them, a velocity component in the peripheral direction and thus promote turbulence in the combustion chambers, into which the gases flow at the time. In a similar way, the same effect can also be produced in the embodiment according to FIGS. 1a and 1b, if corresponding ribs are provided on the inner wall 6 of the cylinder above the sealing strip 7.

The invention may be embodied in other specific forms without departing from the spirit or essential characteristics thereof. The embodiments are therefore to be considered in all respects as illustrative and not restrictive.

What is claimed is:
1. An internal combustion piston engine comprising:
  (a) a cylinder having an inner wall defining a cylinder bore;
  (b) a cylinder head having a wall and being mounted on said cylinder;
  (c) a piston having a head and being reciprocably movable in said cylinder bore, said piston being formed as a stepped piston in which the portion of the axial length of the cylindrical wall adjacent the head thereof is of smaller diameter than the remainder of said cylindrical wall;
  (d) a main combustion chamber formed between said cylinder head and said piston and in which combustion is initiated;
  (e) a spark plug in said main combustion chamber for igniting gases in said main combustion chamber;
  (f) at least one secondary combustion chamber formed by a cavity in said smaller diameter portion spaced from said head of said piston, said secondary combustion chamber having a fixed volume less than that of said main combustion chamber, and at least one channel connecting said main and secondary combustion chamber, said connecting channel between said main combustion chamber and said secondary combustion chamber being formed by the annular gap between the cylindrical wall portion of smaller diameter of said piston and the inner wall of said cylinder; and
  (g) control means for opening and closing said connecting channel between said main and secondary combustion chambers during a portion of each of the compression and expansion strokes of said piston intermediate and spaced from the ends of said respective strokes to regulate the flow of gases in said connecting channel, said control means being adapted to close said connecting channel for a sufficient time at the beginning of said portion of said compression stroke of said piston to further compress gas in said main combustion chamber while the pressure of the gas in said secondary combustion chamber remains substantially constant during said portion of said compression stroke and then, during said compression stroke following said portion thereof, to open said connecting channel just prior to TDC to release the pressure differential built up between said main and secondary combustion chambers and to permit gas to flow at high velocity from said main combustion chamber through said connecting channel into said secondary combustion chamber and thereby carry the flame front from said main combustion chamber to said secondary combustion chamber, creating strong turbulence and complete combustion of gas in said secondary combustion chamber, and to close said connecting channel after TDC for a sufficient time at the beginning of said portion of said expansion stroke of said piston to further expand gas in said main combustion chamber while the pressure of the gas in said secondary combustion chamber remains substantially constant during said portion of said compression stroke and then, during said expansion stroke following said portion thereof, to open said connecting channel to permit gas to flow at high velocity from said secondary combustion chamber through said connecting channel into said main combustion chamber creating strong turbulence of gas and complete combustion of any incompletely burned gas in said main combustion chamber.

2. An internal combustion piston engine as set forth in claim 1, wherein, said control means comprises an annular sealing member projecting inwardly from the inner wall of the cylinder, said annular sealing member being positioned for interaction with the cylindrical wall portion of smaller diameter of the piston to close said annular gap and to prevent flow of gas between the main combustion chamber and the secondary combustion chamber during said portions of said compression and expansion strokes of said piston.

3. An internal combustion piston engine as set forth in claim 2, wherein the annular projection is formed by a sealing strip inserted into the inner wall of the cylinder.

4. An internal combustion piston engine as set forth in claim 1, wherein the cavity forming the secondary combustion chamber is in the shape of a torus.

5. An internal combustion piston engine comprising:
(a) means defining at least one cylinder bore having an inner wall;
(b) a cylinder head having a wall and being mounted at one end of said cylinder bore;
(c) a piston reciprocably movable in said cylinder bore and having a head confronting said wall of said cylinder head forming a main combustion chamber therebetween, said piston having an outer cylindrical wall confronting said inner wall of said cylinder bore, the diameter of a first part of said outer wall of said piston adjacent said head being less than the diameter of the remainder of said outer wall, a cavity in said piston forming a secondary combustion chamber, said secondary combustion chamber having a fixed volume less than that of said main combustion chamber, and a port in said first part of said outer wall spaced from said piston head and communicating with said secondary combustion chamber, whereby an annular connecting channel is formed between said first part of said outer wall of said piston and said inner wall of said cylinder bore connecting said main combustion chamber and said secondary combustion chamber through said port;
(d) a spark plug in said main combustion chamber for igniting gases in said main combustion chamber, and
(e) an annular sealing member projecting inwardly from said inner wall of said cylinder bore, said annular member having an inner surface adapted to engage said first part of said outer wall of said piston;
(f) said port being position in said first part of said outer wall of said piston and said annular sealing member being positioned in said cylinder bore such that:
1. during a portion of the compression stroke of said piston toward said cylinder head intermediate the ends of said compression stroke said annular sealing member closes said annular channel for a sufficient time for further compression of gas in said main combustion chamber while the pressure of gas in said secondary combustion chamber remains substantially constant and then opens said connecting channel as said port passes said annular sealing member just prior to TDC to release the pressure differential built up between said main and secondary combustion chambers to permit gas to flow at high velocity from said main combustion chamber, through said connecting channel into said secondary combustion chamber and thereby carry the flame front from said main combustion chamber to said secondary combustion chamber, creating strong turbulence and complete combustion of gas in said secondary combustion chamber, and
2. during a portion of the expansion stroke of said piston away from said cylinder head intermediate the ends of said expansion stroke said annular sealing member closes said connecting channel after TDC for a sufficient time for further expansion of gas in said main combustion chamber while the pressure of gas in said secondary combustion chamber remains substantially constant and then opens said connecting channel as said piston head passes through said annular sealing member to permit gas to flow at high velocity from said secondary combustion chamber, through said connecting channel into said main combustion chamber creating strong turbulence of any incompletely burned gas in said main combustion chamber and complete combustion of said incompletely burned gas in said main combustion chamber.

* * * * *